(12) United States Patent
Xue et al.

(10) Patent No.: US 10,953,687 B2
(45) Date of Patent: Mar. 23, 2021

(54) COMBINED WHEEL

(71) Applicant: CITIC DICASTAL CO., LTD, Hebei (CN)

(72) Inventors: Bowen Xue, Hebei (CN); Chuanqun Li, Hebei (CN); Weidong Liu, Hebei (CN); Zhuo Zhou, Hebei (CN); Jiandong Guo, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 300 days.

(21) Appl. No.: 16/024,403

(22) Filed: Jun. 29, 2018

(65) Prior Publication Data
US 2019/0193461 A1    Jun. 27, 2019

(30) Foreign Application Priority Data
Dec. 22, 2017 (CN) .......................... 201711401666.8

(51) Int. Cl.
| | | |
|---|---|---|
| B60B 3/04 | (2006.01) | |
| F16D 65/12 | (2006.01) | |
| B60B 27/00 | (2006.01) | |
| B60B 3/10 | (2006.01) | |
| B60B 23/10 | (2006.01) | |
| F16D 65/02 | (2006.01) | |
| F16D 65/847 | (2006.01) | |

(52) U.S. Cl.
CPC .......... B60B 3/045 (2013.01); B60B 27/0047 (2013.01); F16D 65/12 (2013.01); B60B 3/10 (2013.01); B60B 23/10 (2013.01); B60B 2900/111 (2013.01); B60B 2900/513 (2013.01); F16D 65/847 (2013.01); F16D 2065/138 (2013.01); F16D 2065/1372 (2013.01)

(58) Field of Classification Search
CPC ......... B60B 3/0005; B60B 3/04; B60B 3/041; B60B 3/042; B60B 3/044; B60B 3/045; B60B 23/00; B60B 23/06; B60B 23/10; F16D 65/12; F16D 2063/138; B60T 1/065
See application file for complete search history.

(56) References Cited

U.S. PATENT DOCUMENTS

| | | | | |
|---|---|---|---|---|
| 1,378,300 A | * | 5/1921 | Williams | .................. B60B 3/04 |
| | | | | 301/6.1 |
| 1,398,739 A | * | 11/1921 | Putnam | ..................... B60B 3/04 |
| | | | | 301/6.7 |

(Continued)

*Primary Examiner* — Jason R Bellinger
(74) *Attorney, Agent, or Firm* — IPro, PLLC; Qian Gu

(57) ABSTRACT

A combined wheel includes spokes, steel bushings, a rim, a metal frame, a brake disc and pins. In use, the steel bushings are installed in grooves of the spokes; the spokes are placed so that the clamping grooves are matched with the connecting blocks; the pins are installed into holes of the spokes and the connecting blocks; the metal frame is matched with the backs of the spokes; the screws I connect the metal frame, the connecting blocks and the spokes together and are matched with the steel bushings; and the brake disc is connected to the metal frame by screws II. In the combined wheel, the radial force and the axial force generated in the running process of the wheel can be counteracted on the spokes; and the brake disc brakes from the inside, thereby increasing the brake radius and reducing the clamping force required when braking.

1 Claim, 2 Drawing Sheets

(56) References Cited

U.S. PATENT DOCUMENTS

| | | | | |
|---|---|---|---|---|
| 1,406,759 | A * | 2/1922 | Putnam | B60B 3/04 301/6.7 |
| 1,761,928 | A * | 6/1930 | Main | B60B 11/06 301/6.6 |
| 1,840,824 | A * | 1/1932 | Sinclair | B60B 23/10 301/6.1 |
| 1,916,747 | A * | 7/1933 | Wagenhorst | B60B 25/20 301/6.6 |
| 1,924,970 | A * | 8/1933 | Ash | B60B 1/02 301/11.1 |
| 2,019,145 | A * | 10/1935 | Le Jeune | B60B 7/04 301/6.3 |
| 2,041,326 | A * | 5/1936 | Eksergian | B60B 1/14 301/64.101 |
| 2,098,851 | A * | 11/1937 | Ash | B60B 23/10 301/64.101 |
| 4,282,952 | A * | 8/1981 | Bartley | B60B 23/10 180/10 |
| 8,840,193 | B2 * | 9/2014 | Schmidt | B60B 3/14 188/18 A |
| 2010/0176651 | A1 * | 7/2010 | Thomas | F16D 55/22 301/6.8 |
| 2013/0169024 | A1 * | 7/2013 | Schmidt | B60B 3/14 301/6.8 |
| 2015/0273934 | A1 * | 10/2015 | Huidekoper | B60B 3/045 301/11.1 |
| 2018/0037056 | A1 * | 2/2018 | Jungbecker | B60B 3/04 |
| 2019/0193460 | A1 * | 6/2019 | Xue | B60B 27/0047 |

* cited by examiner

COMBINED WHEEL

CROSS REFERENCE TO RELATED APPLICATION

This application claims priority to Chinese Patent Application No. 201711401666.8, entitled COMBINED WHEEL and filed on Dec. 22, 2017, which is incorporated herein by reference in its entirety and for all purposes.

FIELD OF THE INVENTION

The present invention relates to a wheel, specifically to a combined wheel.

BACKGROUND OF THE INVENTION

At present, the automotive industry is advancing towards green development, and it also puts forward a higher requirement for the wheels as important moving parts. In order to achieve the purpose of weight reduction, rims and spokes need to be made of different materials. The rims and spokes made of different materials are often connected by bolting. The wheels may be subjected to radial, axial and shear forces during running. By designing ingenious connecting structures, the quantity of screws used can be effectively reduced. In addition, the hub motor used in an electric vehicle requires a large enough space for a wheel backcavity. The conventional structure of a brake disc severely restricts the design for the structure of hub motor. Therefore, a new brake form is the premise of sufficiently designing the hub motor.

SUMMARY OF THE INVENTION

The aim of the present invention is to provide a combined wheel, wherein the radial force and the axial force generated in the running process of the wheel can be counteracted on spokes, and the shear force generated during running can be prevented from being transmitted to connecting screws for the rim and the spokes, thereby reducing both the quantity of screws employed and the size of the screws; in addition, the brake disc brakes from the inside, thereby effectively increasing the brake radius and reducing the clamping force required when braking.

In order to fulfill the above aim, the technical solution of the present invention is: a combined wheel, comprising spokes, steel bushings, screws I, a rim, a metal frame, screws II, a brake disc, pins and the like, wherein the steel bushings are installed in T-shaped grooves at the outermost parts of the spokes; a plurality of connecting blocks are uniformly distributed in the circumferential direction of the rim and are integrated with the rim, with the arc length formed by an empty slot between every two adjacent connecting blocks being greater than that of the connecting block itself; clamping grooves in the spokes are matched with the connecting blocks respectively; the pins are matched with the spokes and the connecting blocks; the left end face of the metal frame is matched with the back of the spokes; the screws I connect the metal frame, the connecting blocks and the spokes together and are matched with the steel bushings; and the brake disc is matched with the right end face of the metal frame and is connected to the metal frame by the screws II.

During operation, the steel bushings are first installed in the T-shaped grooves at the outermost parts of the spokes; the spokes are placed in the empty slots between the adjacent connecting blocks, and then are rotated so that the clamping grooves thereon are matched with the connecting blocks respectively; the pins are installed into holes of the spokes and the connecting blocks from the back of the spokes; the left end face of the metal frame is matched with the backs of the spokes; the screws I connect the metal frame, the connecting blocks and the spokes together and are matched with the steel bushing; and the brake disc is matched with the right end face of the metal frame and is connected to the metal frame by the screws II.

In use of the combined wheel of the present invention, the radial force and the axial force generated in the running process of the wheel can be counteracted on spokes, and the shear force generated during running can be prevented from being transmitted to connecting screws for the rim and the spokes, thereby reducing both the quantity of screws employed and the size of the screws. In addition, the brake disc brakes from the inside, thereby effectively increasing the brake radius and reducing the clamping force required when braking. Meanwhile, the combined wheel has the characteristics of high structural strength, light weight, large space in rim back-cavity and the like.

Figure 1:
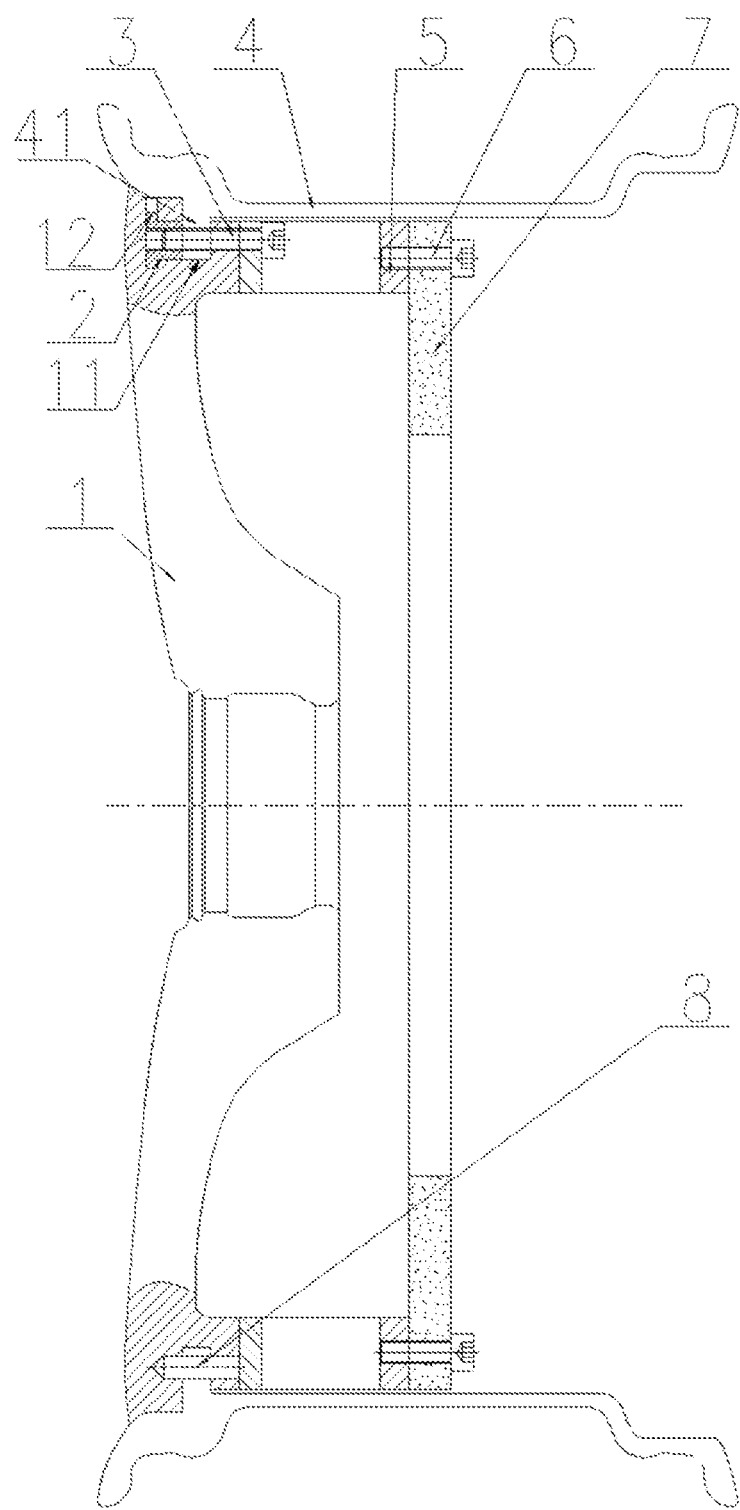
FIG. 1 is a side elevational view of a combined wheel of the present invention.

In the drawings, 1—spoke, 2—steel bushing, 3—screw I, 4—rim, 5—metal frame, 6—screw II, 7—brake disc, 8—pin, 11—clamping groove, 12—T-shaped groove, 41—connecting block, 45—empty slot.

DETAILED DESCRIPTION OF THE EMBODIMENTS

The details and working conditions of the specific device according to the present invention will be described below in combination with the drawings.

Figure 2:
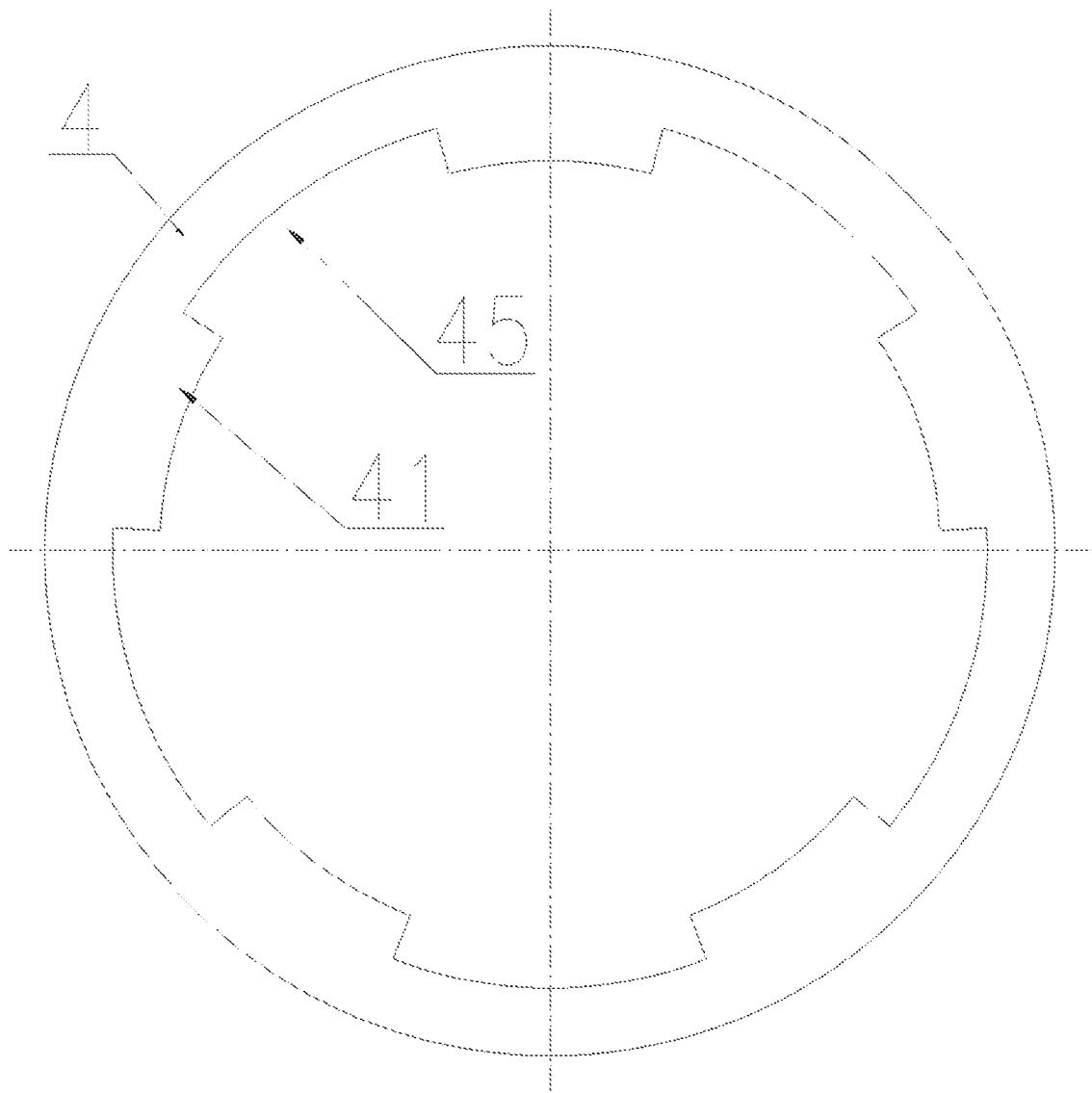
FIG. 2 is a front plan view of a rim of the combined wheel of the present invention.

As shown in FIGS. 1-3, the device comprises spokes 1, steel bushings 2, screws I 3, a rim 4, a metal frame 5, screws II 6, a brake disc 7, pins 8 and the like, wherein the steel bushings 2 are installed in T-shaped grooves 12 at the outermost parts of the spokes 1; a plurality of connecting blocks 41 are uniformly distributed in the circumferential direction of the rim 4 and are integrated with the rim 4; the arc length formed by an empty slot 45 between every two adjacent connecting blocks 41 is greater than that of the connecting block 41 itself; clamping grooves 11 in the spokes 1 are matched with the connecting blocks 41; the pins 8 are matched with the spokes 1 and the connecting blocks 41; the left end face of the metal frame 5 is matched with the backs of the spokes 1; the screws I 3 connect the metal frame 5, the connecting blocks 41 and the spokes 1 together and are matched with the steel bushings 2; and the brake disc 7 is matched with the right end face of the metal frame 5 and is connected to the metal frame 5 by the screws II 6.

During operation, the steel bushings 2 are first installed in the T-shaped grooves 12 at the outermost parts of the spokes 1; the spokes 1 are placed in the empty slots 45 between the adjacent connecting blocks 41, and then are rotated so that the clamping grooves 11 thereon are matched with the connecting blocks 41 respectively; the pins 8 are installed into holes of the spokes 1 and the connecting blocks 41 from the back of the spokes 1; the left end face of the metal frame 5 is matched with the backs of the spokes 1; the screws I 3 connect the metal frame 5, the connecting blocks 41 and the spokes 1 together and are fitted into the steel bushings 2; and the brake disc 7 is matched with the right end face of the metal frame 5 and is connected to the metal frame 5 by the screws II 6.

The invention claimed is:

1. A combined wheel, comprising spokes, steel bushings, first screws, a rim, a metal frame, second screws, a brake disc and pins, wherein the steel bushings are installed in T-shaped grooves at the outermost parts of the spokes; a plurality of connecting blocks are uniformly distributed in a circumferential direction of the rim and are integrated with the rim, with an arc length formed by an empty slot between every two adjacent connecting blocks being greater than a length of the connecting block; clamping grooves in the spokes are matched with the connecting blocks respectively; the pins are matched with the spokes and the connecting blocks; a left end face of the metal frame is matched with backs of the spokes; the first screws connect the metal frame, the connecting blocks and the spokes together and are matched with the steel bushings; and the brake disc is matched with a right end face of the metal frame and is connected to the metal frame by the second screws.

* * * * *